(12) United States Patent
Bezamat et al.

(10) Patent No.: US 12,386,198 B2
(45) Date of Patent: Aug. 12, 2025

(54) EYEWEAR HAVING A TEMPLE ASSEMBLY AND TEMPLE ASSEMBLY FOR EYEWEAR

(71) Applicants: Ashley Bezamat, Los Angeles, CA (US); Riccardo Baldini, Goito (IT)

(72) Inventors: Ashley Bezamat, Los Angeles, CA (US); Riccardo Baldini, Goito (IT)

(73) Assignee: Ashley Bezamat, Los Angeles, CA (US)

( * ) Notice: Subject to any disclaimer, the term of this patent is extended or adjusted under 35 U.S.C. 154(b) by 530 days.

(21) Appl. No.: 17/686,989

(22) Filed: Mar. 4, 2022

(65) Prior Publication Data

US 2022/0334408 A1 Oct. 20, 2022

Related U.S. Application Data

(60) Provisional application No. 63/156,863, filed on Mar. 4, 2021.

(51) Int. Cl.
*G02C 5/20* (2006.01)
*G02C 5/14* (2006.01)

(52) U.S. Cl.
CPC ............... *G02C 5/20* (2013.01); *G02C 5/143* (2013.01); *G02C 2200/04* (2013.01); *G02C 2200/08* (2013.01)

(58) Field of Classification Search
CPC . G02C 5/14; G02C 5/143; G02C 5/20; G02C 2200/04; G02C 2200/08; G02C 2200/12
USPC ................................................ 351/118–119
See application file for complete search history.

(56) References Cited

U.S. PATENT DOCUMENTS

| | | | | |
|---|---|---|---|---|
| 3,031,925 A | * | 5/1962 | Barrington ........... | G02C 5/2209 351/116 |
| 3,118,962 A | * | 1/1964 | Hammond ............... | G02C 5/20 351/118 |
| 3,957,360 A | * | 5/1976 | Villani ................. | G02C 5/2227 351/113 |
| 5,359,370 A | * | 10/1994 | Mugnier ................ | G02C 11/08 351/111 |
| 5,652,637 A | * | 7/1997 | Marini ................... | G02C 5/146 351/116 |
| 5,781,272 A | * | 7/1998 | Bright ...................... | G02C 5/20 351/158 |
| 7,997,722 B2 | * | 8/2011 | Gottschling ......... | G02C 5/2209 351/113 |
| 9,033,491 B2 | * | 5/2015 | Allen ....................... | G02C 3/04 351/63 |
| 9,081,212 B1 | * | 7/2015 | Frost ...................... | G02C 5/126 |
| 9,448,420 B2 | * | 9/2016 | Tormen .................. | G02C 5/146 |
| 9,563,069 B2 | * | 2/2017 | Gochenour ............ | G02C 3/003 |

(Continued)

FOREIGN PATENT DOCUMENTS

WO WO-9938047 A1 * 7/1999 ............. G02C 5/146

*Primary Examiner* — Zachary W Wilkes
(74) *Attorney, Agent, or Firm* — The Watson IP Group; Jovan N. Jovanovic

(57) ABSTRACT

Eyewear having a frame front, a first temple and a second temple. The first temple extends from a first side of the frame front. The second temple extends from a second side of the frame front. At least one of the first temple and the second temple includes a front portion and a rear portion. Temple structures having a base member are disclosed, along with temples for eyewear and methods of attaching portions of temples of eyewear.

9 Claims, 7 Drawing Sheets

(56) References Cited

U.S. PATENT DOCUMENTS

| | | | |
|---|---|---|---|
| 11,409,129 B2* | 8/2022 | Otra | G02C 5/20 |
| 2003/0020866 A1* | 1/2003 | Asano | G02C 5/00 |
| | | | 351/122 |
| 2008/0278677 A1* | 11/2008 | Gottschling | G02C 5/008 |
| | | | 351/116 |
| 2013/0321759 A1* | 12/2013 | Allen | G02C 3/04 |
| | | | 351/114 |
| 2019/0235272 A1* | 8/2019 | Otra | G02C 5/006 |

* cited by examiner

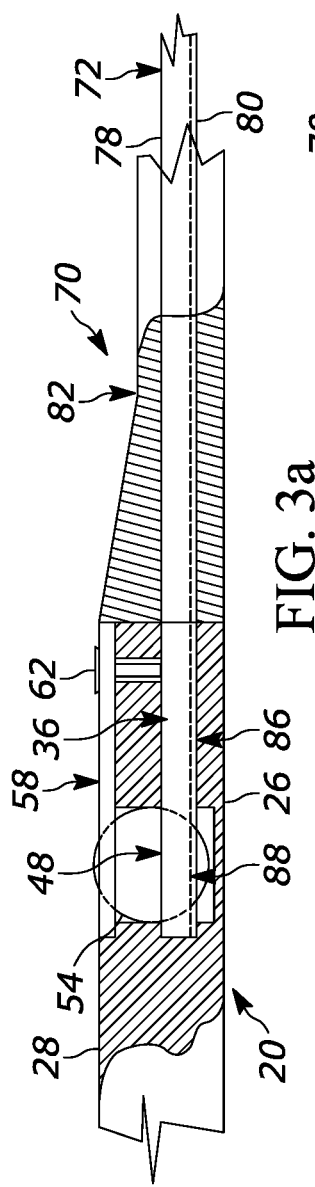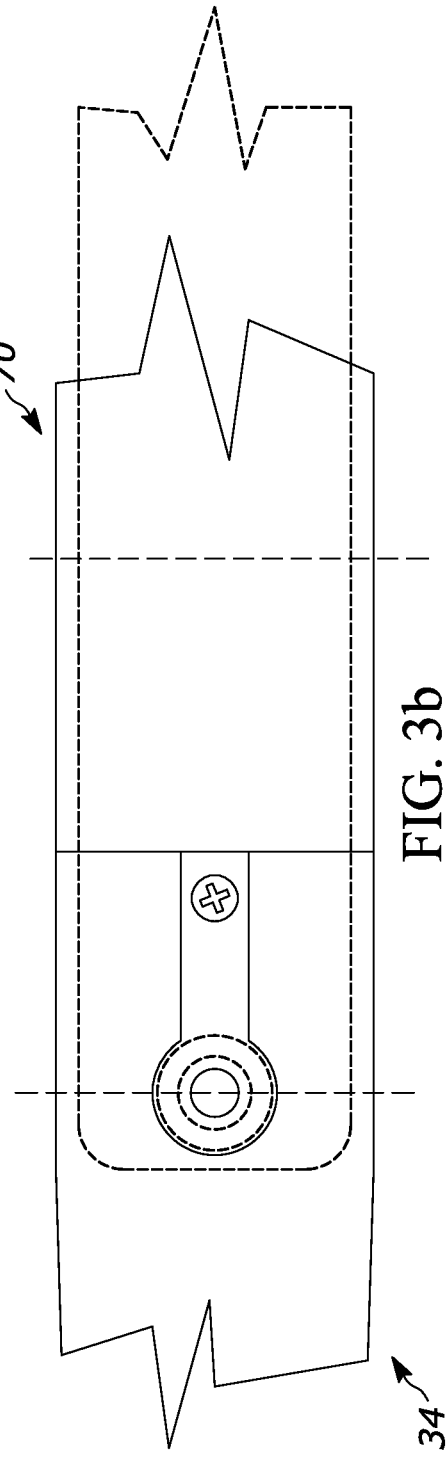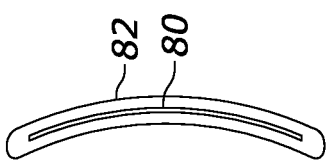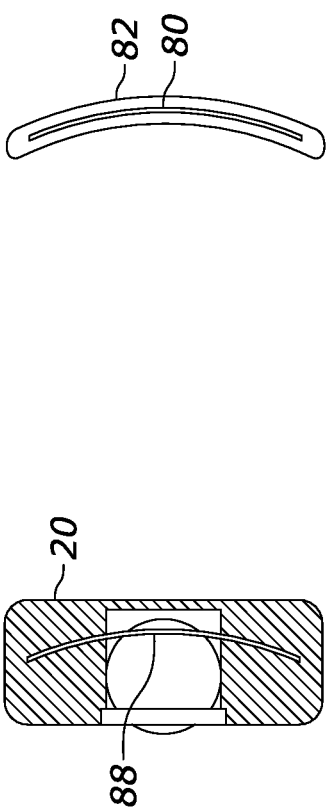

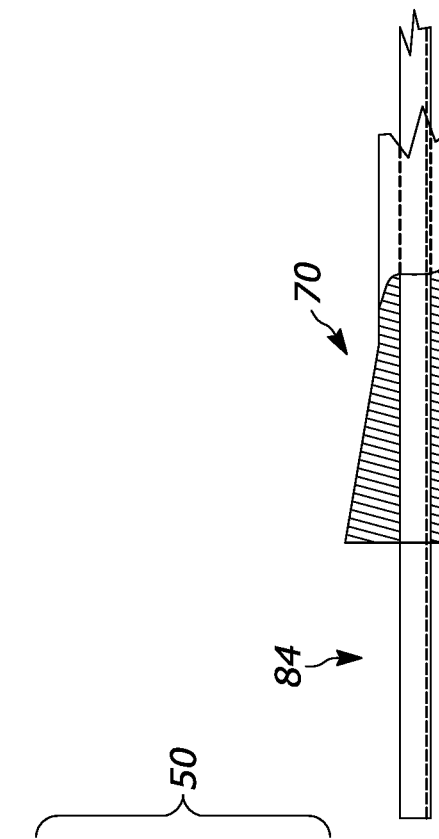
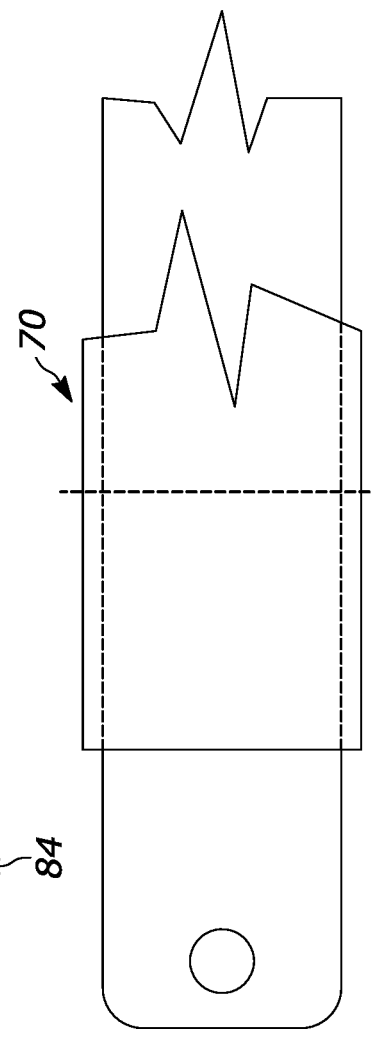
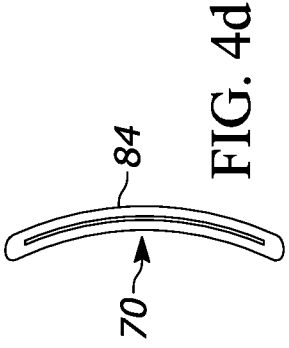
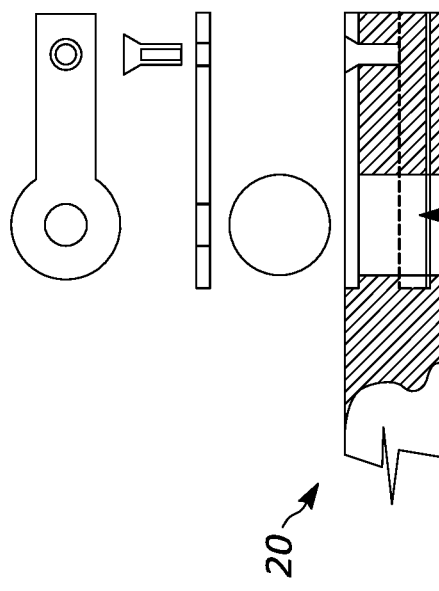
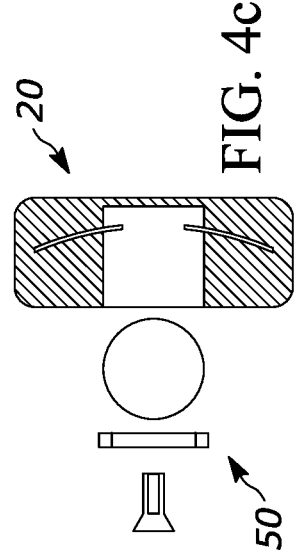

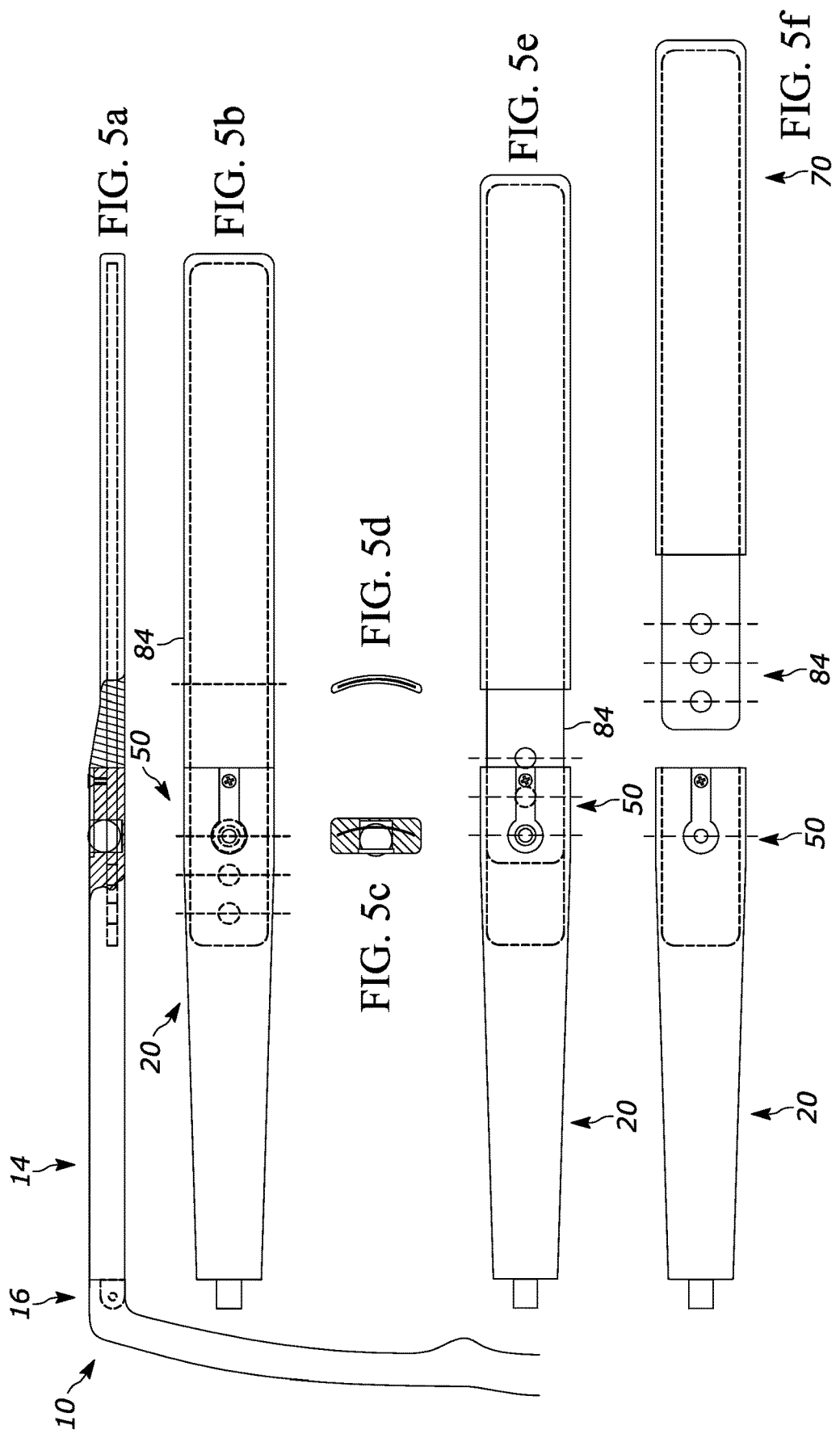

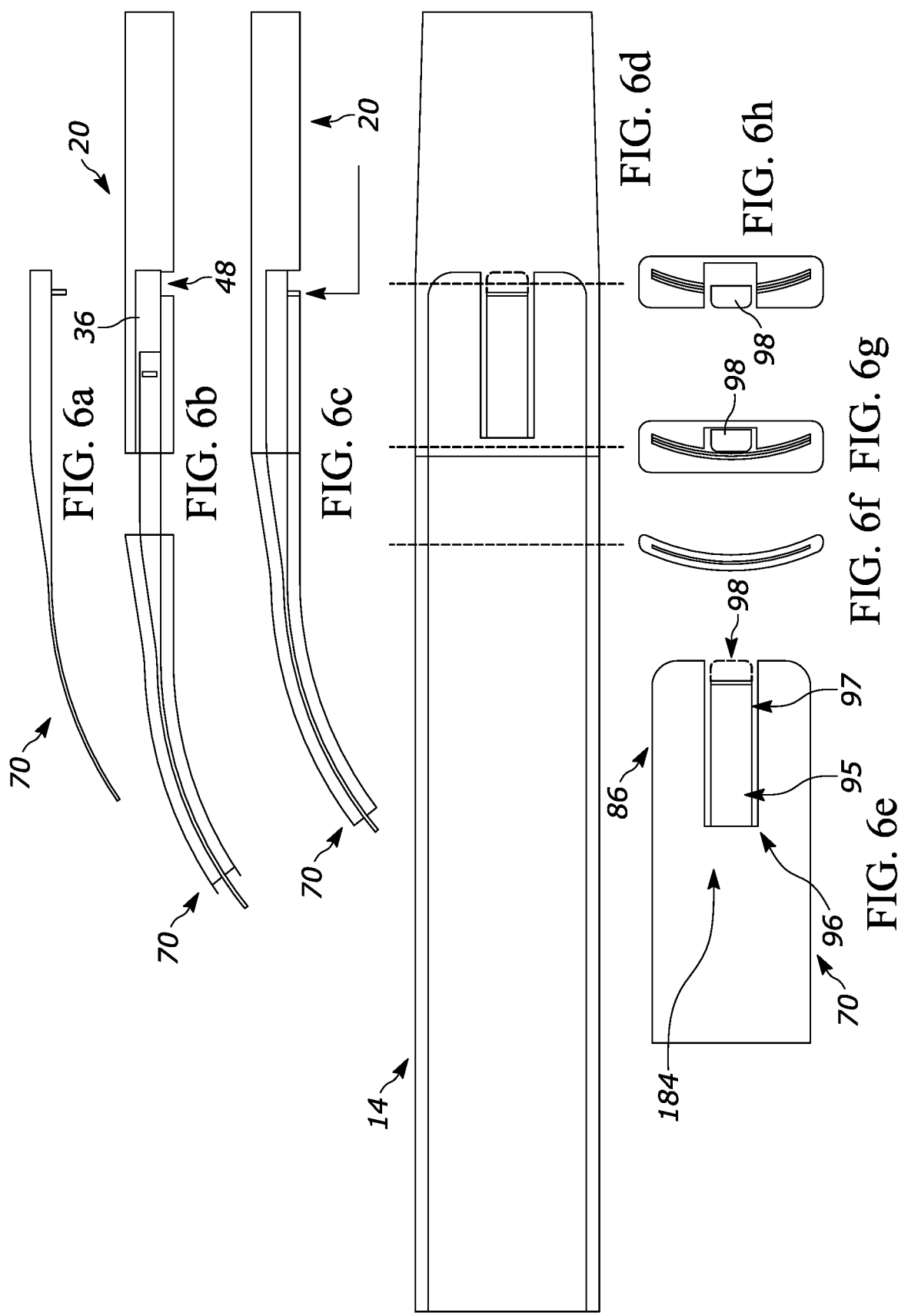

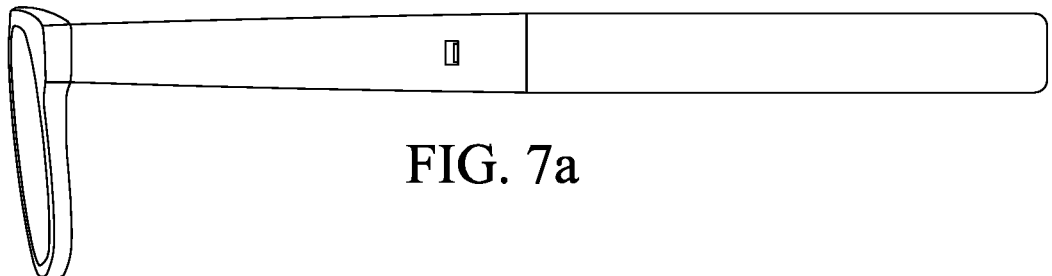
FIG. 7a
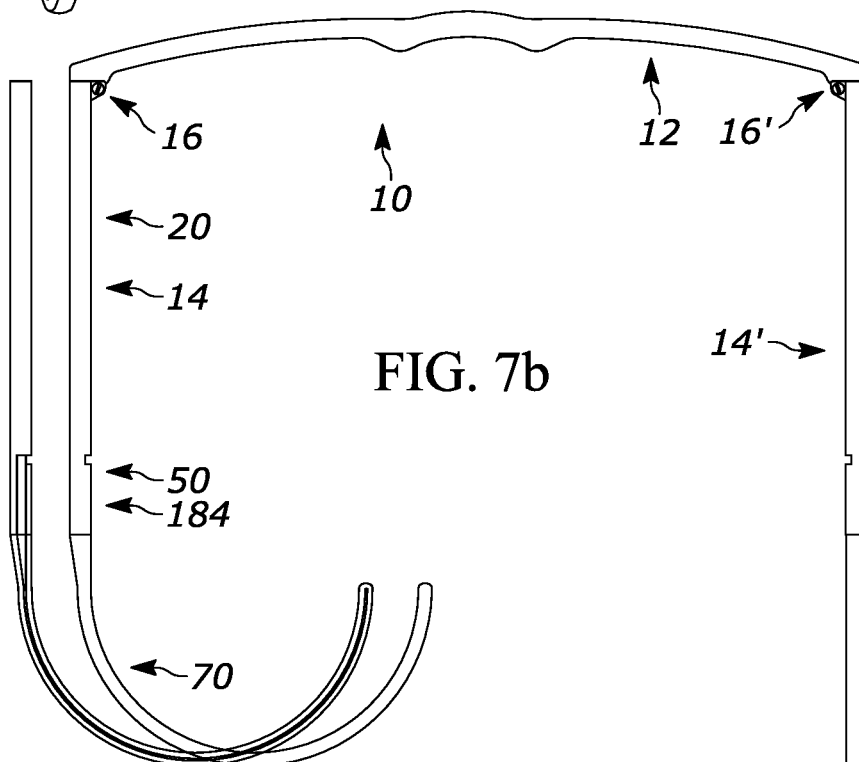
FIG. 7b
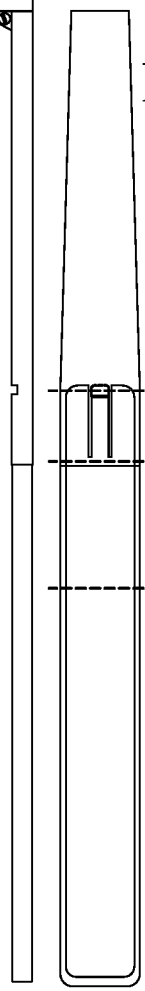
FIG. 7c
FIG. 7d
FIG. 7e
FIG. 7f
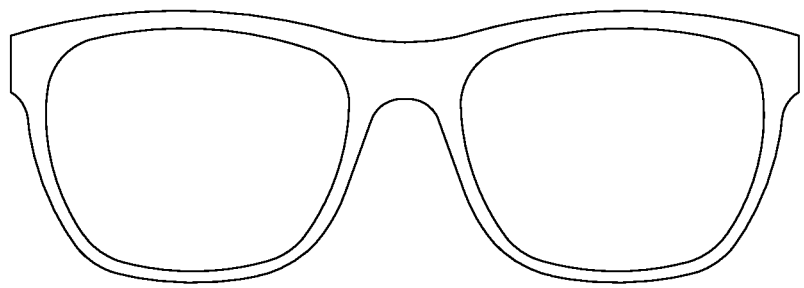
FIG. 7g

EYEWEAR HAVING A TEMPLE ASSEMBLY
AND TEMPLE ASSEMBLY FOR EYEWEAR

CROSS-REFERENCE TO RELATED
APPLICATION

This application claims priority to U.S. Provisional Patent Application Ser. No. 63/156,863, filed Mar. 4, 2021, entitled "EYEWEAR HAVING A TEMPLE ASSEMBLY AND TEMPLE ASSEMBLY FOR EYEWEAR", the entire specification of which is hereby incorporated by reference.

BACKGROUND OF THE DISCLOSURE

1. Field of the Disclosure

The disclosure relates in general to eyewear, and more particularly, to a configuration for a temple for eyewear, and to eyewear having a temple assembly.

2. Background Art

The use of eyewear and the design thereof is known in the art.

Typically, eyewear includes a front face, and opposing first and second temples. The front face typically includes lenses or the like, with the temples extending therefrom either fixedly or hingedly so as to lie along the sides of the user's head. In some instances, the entire eyewear frame may be formed from a single integrally formed member, whereas in other configurations, the eyewear may comprise multiple components. In many instances, the components are not adjustable, or are adjustable in minimal fashion. In other instances, the adjustability may be inadequate to cover the different configurations, sizes and features of users.

Presented herein are configurations of eyewear that provide additional utility and features to the temple portion of the eyewear and to the overall eyewear.

SUMMARY OF THE DISCLOSURE

The disclosure is directed to eyewear that includes a frame front, a first temple and a second temple, wherein the temples are hingedly coupled (or otherwise attached) to the front frame. Specifically, the first temple extends from a first side of the frame front. The second temple extends from a second side of the frame front. At least one of the first temple and the second temple includes a front portion and a rear portion.

In another aspect, the disclosure is directed to a temple for eyewear having a base member comprising an arcuate cross-sectional configuration, positionable in a straight orientation and in a bent orientation due to the arcuate cross-sectional configuration thereof.

In some configurations, the disclosure is directed to a temple for eyewear having a front portion and a rear portion being attachable to each other.

More specifically, the front portion has one of a retaining assembly and a coupling structure and is releasably attachable to a rear portion having the other of the retaining assembly and the coupling structure. That is the retaining assembly and the coupling structure are releasably attachable.

Further eyewear, temple structures and configurations are disclosed, along with methods of attaching portions of temples of eyewear.

In another aspect of the disclosure, the disclosure is directed to eyewear comprising a frame front, a first temple and a second temple. The first temple extends from a first side of the frame front. The second temple extends from a second side of the frame front. At least one of the first temple and the second temple include a front portion and a rear portion. The front portion being releasably attachable to the rear portion. The front portion having a rear portion coupling assembly that includes an end slot and a retaining assembly. The end slot defines a cavity with a transverse bore in communication with the cavity. The retaining assembly having a retention member insertable into the transverse bore and at least partially into the cavity. A biasing member selectively biases the retention member toward and into the cavity. The rear portion further includes a coupling structure including an insert tab insertable through the end slot and into the cavity. An engaging member is engageable with the retention member so as to releasably secure the insert tab within the cavity of the front portion.

In some configurations, the retention member comprises a ball. The biasing member comprises a cantilever member having a first end attached to the front portion and a second end cantilevered over the transverse bore. The second end is biased toward the cavity so as to direct the ball thereinto.

In some configurations, the second end includes an opening configured to engage the ball.

In some configurations, the first end of the cantilever member is attached by a fastener that extends through the first end and into the front portion of the first temple.

In some configurations, the rear portion has a proximal end interfaceable with the front portion and a distal end opposite the proximal end. The first end of the cantilever member corresponds to the proximal end, and the second end of the cantilever member extending toward the distal end.

In some configurations, the cantilever member is positioned on an outer side of the front portion.

In some configurations, the cantilever member and the retention member comprise one of separate members and integrally formed member.

In some configurations, the engaging member of the coupling structure comprises an opening configured to receive the ball, wherein the opening is smaller than a diameter of the ball.

In some configurations, the coupling structure comprises a plurality of openings, positioned sequentially along the rear portion. The ball is engageable with a plurality of the plurality of openings, to, in turn, adjust a length of the portion of the rear portion that extends into the cavity.

In some configurations, the base member of the rear portion comprises a convex configuration along the length thereof, with an overmolded cover extending over at least a portion of the base member.

In some configurations, the base member comprises a spring steel and the overmolded cover comprises a polymer.

In some configurations, the first temple and the second temple are substantial mirror images of each other.

In some configurations, the first temple and the second temple are hingedly coupled to the frame front on opposite sides thereof.

In another aspect of the disclosure, the disclosure is directed to eyewear having a frame front, a first temple and a second temple. The first temple extends from a first side of the frame front. The second temple extends from a second side of the frame front. At least one of the first temple and the second temple includes a front portion and a rear portion, with the front portion being releasably attachable to the rear portion. The rear portion includes a base member that has an arcuate cross-sectional configuration, positionable in a straight orientation and in a bent orientation due to the arcuate cross-sectional configuration thereof.

In some configurations, the base member of the rear portion comprises a convex configuration along the length thereof, with an overmolded cover extending over at least a portion of the base member.

In some configurations, the base member comprises a spring steel and the overmolded cover comprises a polymer.

In some configurations, the first temple and the second temple are substantial mirror images of each other.

In some configurations, the first temple and the second temple are hingedly coupled to the frame front on opposite sides thereof.

BRIEF DESCRIPTION OF THE DRAWINGS

The disclosure will now be described with reference to the drawings wherein:

FIGS. 3a through 3d of the drawings is a collection of views of a portion of the front portion and the rear portion of the temple, showing the joining thereof;

FIG. 4a through 4d of the drawings is a collection of views of a portion of the front portion and the rear portion of the temple, showing the joining thereof;

FIGS. 5a through 5f of the drawings is a collection of views of another configuration of the eyewear of the present disclosure, showing, in particular, an adjustable version, wherein the rear portion can be positioned in three separate releasably secured positions relative to the front portion of the temple;

FIGS. 6a through 6h of the drawings is a collection of views of another configuration of the present disclosure; and FIG. 7a through 7g of the drawings is a collection of views of the configuration shown in FIGS. 6a through 6h of the present disclosure.

DETAILED DESCRIPTION OF THE DISCLOSURE

Figure 1:
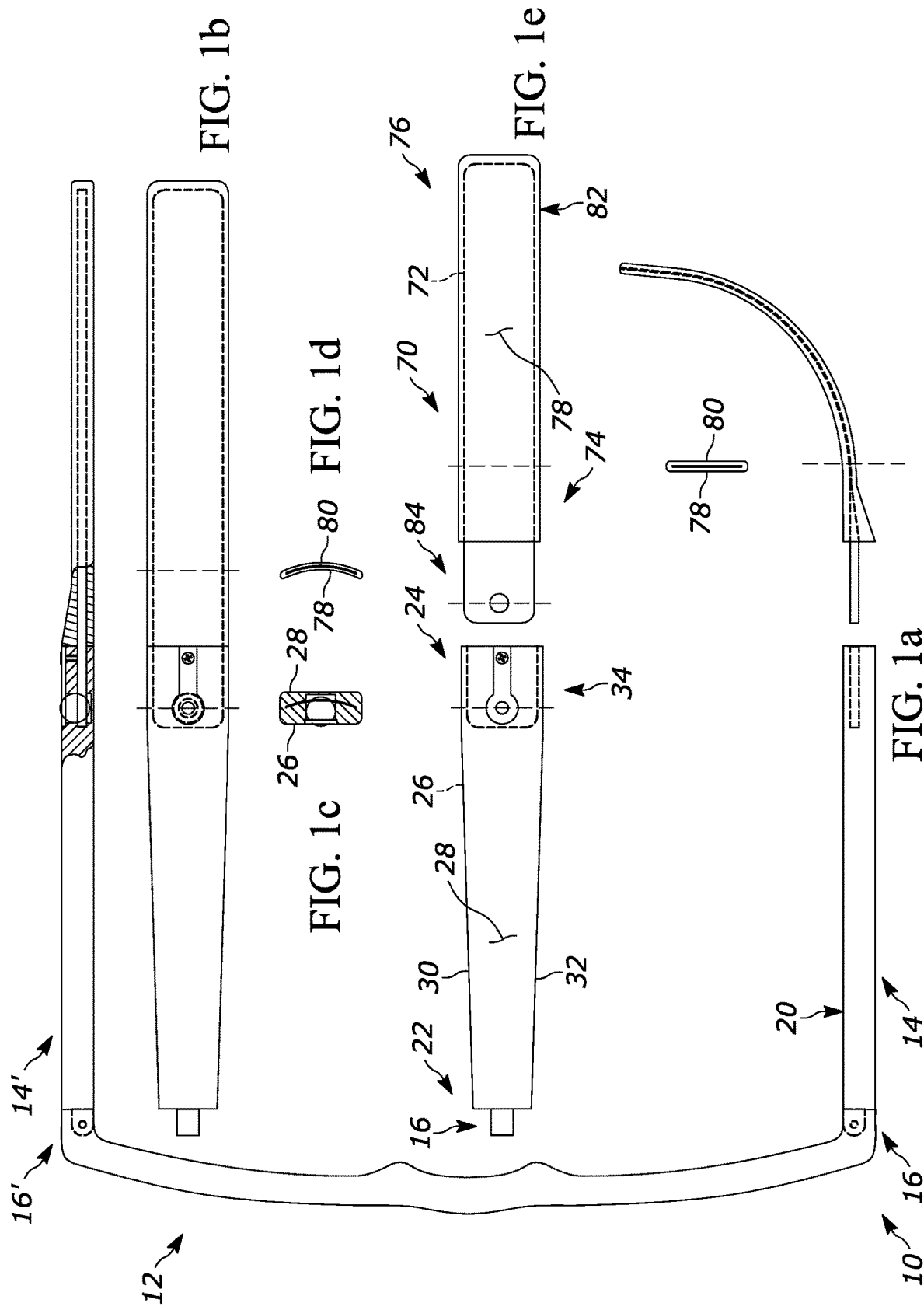
FIGS. 1a through 1e of the drawings is a collection of views of a configuration of the eyewear of the present disclosure.
Figure 2:
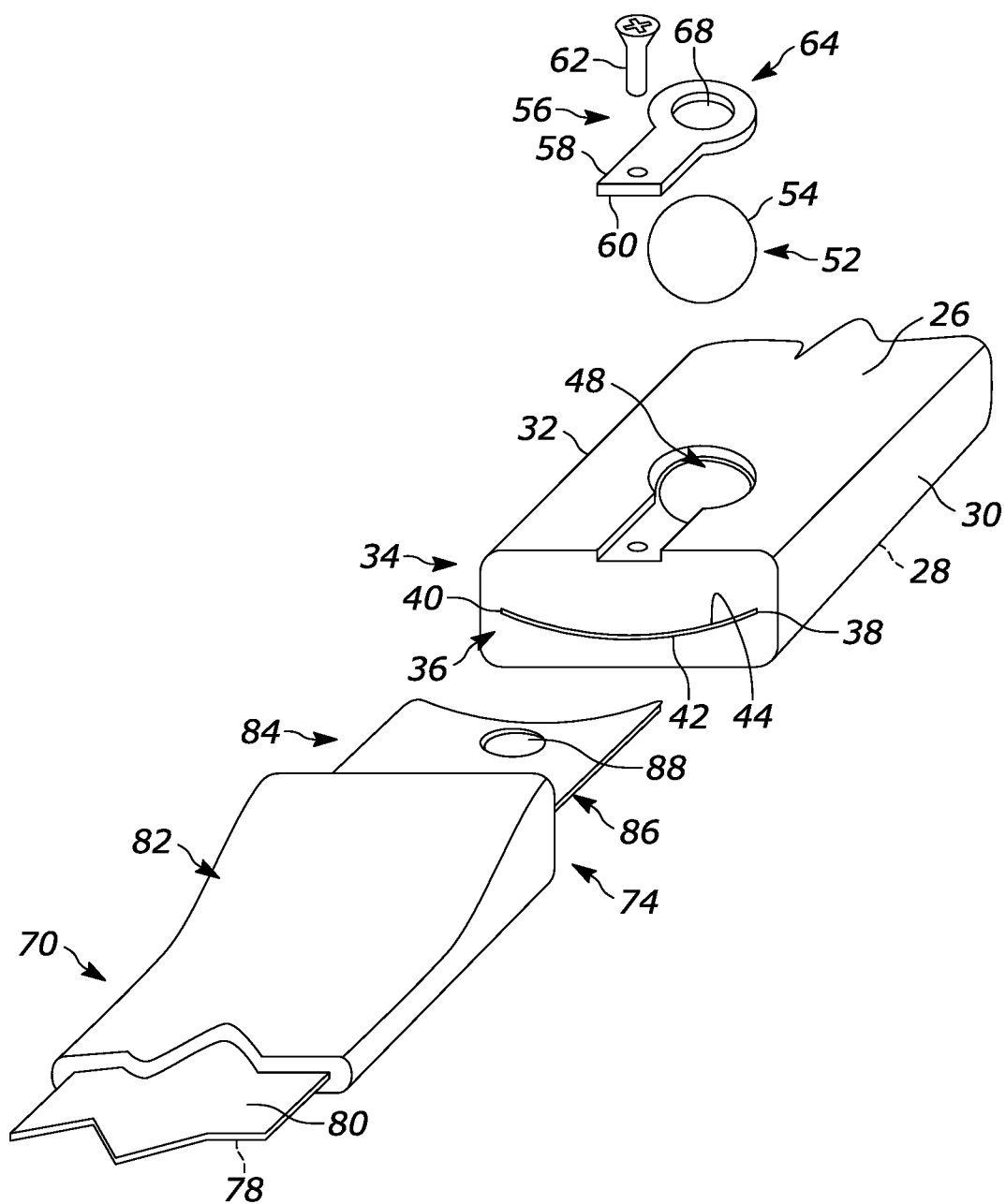
FIG. 2 of the drawings is a perspective view of a portion of the front portion and the rear portion of the temple, showing an exploded view thereof.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIGS. 1a-1d through 4a-4d, the eyewear of the present disclosure is shown generally at 10. The eyewear includes frame front 12, first temple 14, second temple 14', first hinge 16 and second hinge 16'. The frame front 12 may comprise any number of different configurations made from any number of different materials, including, but not limited to polymers, metal frames, combination frames, among others. The frame front includes, as will be known to those of skill in the art, a plurality of lenses (or a single lens that spans across the frame front) and a bridge traversing the nose of the user. While hinges are disclosed coupling the temples to the frame front, in other configurations, the frame front and the temples may be attached by other structures.

A first temple 14 extends away from one end of the frame front. A second temple 14' extends away from a second end of the frame front. The first temple 14 is a mirror image of the second temple 14'. As such, the first temple will be described with the understanding that the second temple 14' is substantially identical thereto. The first temple includes front portion 20 and rear portion 70 that are releasably secured to each other in releasable engagement. In one configuration, the front portion comprises approximately 40% to 60% of the overall length of the temple, whereas in other configurations, such lengths may be different, the front portion may be larger or smaller.

The front portion includes proximal end 22, distal end 24, inner side 26, outer side 28, upper edge 30 and lower edge 32. In the configuration shown, the proximal end is attached to the frame front through first hinge 16. In the configuration shown, the front portion comprises an elongated member. In some configurations, the cross-sectional configuration may be rectangular, elliptical, circular, square, polygonal and/or arbitrary, without limitation. The cross-sectional configuration may be varied along the length of the front portion. Preferably, the front portion has sufficient cross-sectional configuration proximate the distal end so as to accommodate the rear portion coupling assembly.

The rear portion coupling assembly 34 includes end slot 36, transverse bore 48 and retaining assembly 50. The end slot 36 defines an upper wall 38, lower wall 40, outer wall 42, inner wall 44 and base wall 46. In the configuration shown, the inner and outer walls comprise arcuate configurations, with the upper and lower walls being substantially smaller than the inner and outer walls. The base wall 46 is spaced apart from the distal end 24 of the front portion to define a depth of the end slot 36. In the configuration shown, the distal end and the base wall each define a plane, and the planes thereof are substantially parallel to each other. It is contemplated that the planes defined by these surfaces may be oblique to each other, or that they may comprise arcuate configurations, or staggered, stepped, or curved configurations in other embodiments.

A transverse bore extends from at least one of the inner surface and the outer surface meeting with the cavity defined by the end slot. In the configuration shown, the transverse bore comprises a generally circular cross-sectional configuration, while other configurations are contemplated. In the configuration shown, the cross-sectional configuration is substantially uniform, but variations are contemplated. The transverse bore provides communication with the cavity formed by the end slot. In the configuration shown, the transverse bore is generally substantially perpendicular to the longitudinal axis of the first temple, while other configurations, such as those where the transverse bore is oblique thereto are likewise contemplated. Additionally, the transverse bore is spaced apart from the base wall, the upper wall and the lower wall, however it is contemplated that the bore may be closer to one of these walls, and may abut or intersect therewith.

The retaining assembly 50 comprises retention member 52 and biasing member 56. The retention member 52, in the configuration shown, comprises a sphere (i.e., a ball). In other configurations, other shapes that have curved surfaces, conical surfaces, or frusto-conical surfaces are contemplated for use, without limitation. It is also contemplated that the surfaces may also include other shapes, such as inclines, pin members of various cross-sectional configurations and the like. The sphere is insertable and positionable within the transverse bore 48. In the configuration shown, a portion of the sphere extends beyond the outer side 28 of the front portion, while in other configurations, the sphere may be fully contained within the transverse bore.

The biasing member 56 in the configuration shown comprises cantilever member 58 having a first end 60 and a second end 64. The first end 60 is coupled to the outer side 28 of the front portion proximate the distal end 24 (and may be set in a channel so that the cantilever member is substantially flush with the outer surface of the front portion). In some configurations, the first end is fastened with the use of a threaded fastener 62. In other configurations, the first end may be snap fit or interference fit to the first portion of the first temple. In other configurations, a rivet may be utilized, or the structures may be adhered or welded together. Of course, these fasteners are disclosed with the understanding that they are exemplary and not to be deemed limiting. It is also contemplated that the cantilever may be attached at opposing ends to the front portion or multiple areas of the front portion with fasteners or other attachment members, wherein the opening or other interface with the retention member is between opposing ends or structures which may be fastened.

The second end 64 of the cantilever member 58 includes an opening 68 defined therethrough. The opening 68 comprises a circle that shape matingly engages the sphere 54 of the retention member. In the configuration shown, the cantilever member comprises an elongated rectangular configuration at the first end, and terminates with a circular configuration at the second end that is concentric with the opening 68 therethrough. It will be understood that the cantilever member maintains the sphere within the transverse bore 48. Additionally, the cantilever member and the opening thereof is configured to apply an inward biasing force against the sphere biasing the sphere toward the inner side 26 of the first temple. It is contemplated that in some configurations, the retention member and the biasing member may be integrally formed as a single member or may comprise separate members that are coupled or fastened together in a permanent or semi-permanent engagement.

It will be understood that while a single retention member is utilized along with the biasing member, a number of retention members may be positioned sequentially or in a side by side orientation to provide enhanced retention of the rear portion, or may provide adjustability by allowing for sequential releasable locking between the front portion and the rear portion in a number of relative positions (i.e., making the overall first temple longer or shorter or of a different configuration).

The rear portion 70 is shown in FIGS. 1a-1d through 4a-4d as comprising base member 72, overmolded cover 82 and coupling structure 84. In the configuration shown, the base member 72 extends substantially the entirety of the rear portion, and the coupling structure is formed therefrom. The base member comprises proximal end 74, distal end 76, outer surface 78 and inner surface 80. An upper and lower edge 77, 79 is likewise defined by the base member 72. In the configuration shown, the base member comprises an arcuate member, preferably formed from a spring steel or other metal structure (while not required, and other materials are contemplated), that when pressed on the convex side alters in configuration from substantially straight to be curved in the direction of the prior convex configuration. In other words, the arcuate cross-sectional configuration, allows the base member to be positionable in a straight orientation and in a bent arcuate orientation due to the arcuate cross-sectional configuration thereof. For example, as shown in FIG. 1, where the base member 72 is in a straight orientation, the inner surface 80 and outer surface 78 are curved, whereas, when the base member is in a curved orientation, the inner surface 80 and outer surface 78 are substantially planar.

Such structures are commonly found in slap type bracelets that have been the subject of children's toys and the like, and are known in the art of children's bracelets and the like (while it is contemplated that in the present disclosure, such bending will not form a full circle, but preferably arcuate configurations). Thus, when positioned in the operable position on a user's head, the curvature can follow the user's head and conform thereto, thereby assisting the placement thereof, and minimizing the possibility of dislodging the eyewear. This can be quite useful for sporting applications among others.

It will be understood that the rear portion is shown as being substantially straight, however, it is contemplated that the rear portion may be curved so as to extend downwardly and rearwardly behind the ears of a user, for example. Of course, other shapes are likewise contemplated.

The overmolded cover 82 comprises, preferably, a polymer overmold over the base member between the distal end and the portion forming the coupling structure 84. The polymer overmold is structurally configured to both provide a mating configuration to the front portion, and also can be utilized to control the arcuate configuration and the various orientation (i.e., stable equilibrium positions) of the base member in both the straight and the curved orientation. Furthermore, the overmolded cover provides a cushion or comfortable surface upon which to contact the head of a user. While it is contemplated that the overmolded cover is molded over the base member, it is contemplated (and the term overmolded shall include) members that are joined to the base member after formation, such as either slid over (interference fit) or adhered. It is contemplated that the overmolded cover may extend only over a portion of the base member between the distal end and the coupling structure, and it is contemplated that it may include one or more separate components which may or may not be joined together.

The coupling structure 84 is shown as comprising an insert tab 86 having a retention member engaging member 88 which engages with and interacts with the retention member 52. In the configuration shown, the insert tab 86 matches in shape to the end slot 36 such that when inserted, the insert tab occupies substantially the entirety of the cavity formed by the end slot 36. In the configuration shown, the engaging member 88 comprises opening 90 which is configured to engage with the sphere 54 when the insert tab is properly seated within the cavity of the end slot 36. In the configuration shown, the base member forms the coupling structure, whereas in other configurations, this may comprise a separate component attached to the base member, wherein the separate component may be of any shape, size and/or configuration.

It will be understood that when inserted, the front edge of the insert tab pushes the sphere 54 upwardly within the transverse slot, overcoming the biasing force of the cantilever member. Further insertion eventually aligns the opening 90 of the coupling structure 84 with the sphere, and the cantilever member biases the sphere into the opening 90, thereby releasably locking the rear portion to the front portion. It will further be understood that the use of the base member 72 described above and the ability thereof to curve can be utilized independently in association with a temple, wherein the temple, for example, comprises a single structure that is not separable into multiple components.

Where multiple openings are utilized on the engaging member, such as is shown in FIG. 5, the rear portion may be releasably locked in multiple (i.e., three in the configuration shown, which is illustrative and not to be deemed limiting) different orientations relative to the front portion. In still other configurations, a single opening may be provided on the coupling structure with multiple spheres being utilized on the front portion.

It is further contemplated that the coupling structure may be on the front portion, and the retaining assembly may be on the rear portion. In still other configurations, it is contemplated that the rear portion may comprise a material other than the arcuately configured base member, and may comprise a member that generally retains a single shape. Additionally, in other configurations, the coupling structure and/or the retaining assembly may comprise one or more magnets that interact with each other or with ferro magnetic members on either of the temple portions. Additionally, where the eyewear is electrified or includes processing capabilities (smart eyewear), a charging port may be positioned within the cavity formed in the front portion, or in a separate cavity that may be accessible if the front and rear portions are separated.

In another aspect of the disclosure, and with reference to FIGS. 6a-6h and 7a-7f, the retaining assembly may be omitted from the front portion, and the rear portion may include a coupling structure 184 that comprises a cantilever member 95 having a proximal end 96 and a distal end 97. The distal end include outward flange 98. In such a configuration, upon insertion, the cantilever member is directed inwardly so as to be insertable into the corresponding end slot. As the flange 98 reaches the transverse opening, the cantilever member outwardly biases the flange into the transverse opening, thereby precluding removal until a user depresses the tab out of the transverse opening.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. Eyewear comprising:
a frame front;
a first temple extending from a first side of the frame front;
a second temple extending from a second side of the frame front;
at least one of the first temple and the second temple including a front portion and a rear portion, with the front portion being releasably attachable to the rear portion, the front portion having a rear portion coupling assembly including:
an end slot defining a cavity with a transverse bore in communication with the cavity, the end slot being concave in the direction of the transverse bore; and
a retaining assembly having a retention member comprising a sphere insertable into the transverse bore and partially into the cavity, with a biasing member selectively biasing the retention member toward and into the cavity, the biasing member comprising a cantilever member having a first end attached to an outside surface of the front portion, and a second end cantilevered over the transverse bore, and having an opening which accepts a portion of the sphere therein, with a portion of the sphere being visible therethrough,
the rear portion including a coupling structure including an insert tab insertable through the end slot and into the cavity, with an engaging member which comprises an opening on the insert tab engageable with the sphere while the sphere is engageable with the cantilever member, so as to releasably secure the insert tab within the cavity of the front portion through the capturing of the sphere between the cantilever member and the opening.

2. The eyewear of claim 1 wherein the first end of the cantilever member is attached by a fastener that extends through the first end and into the front portion of the first temple.

3. The eyewear of claim 2 wherein the rear portion coupling assembly has a proximal end interfaceable with the front portion and a distal end opposite the proximal end, with the first end of the cantilever member corresponding to the proximal end, and the second end of the cantilever member extending toward the distal end.

4. The eyewear of claim 1 the cantilever member is fastened to the outer surface of the front portion, and being flush with the outer surface when the rear portion is releasably attached to the front portion.

5. The eyewear of claim 1 wherein the coupling structure comprises a plurality of openings, positioned sequentially along the rear portion, with the sphere engageable with each one of the plurality of openings, to, in turn, adjust a length of the portion of the rear portion that extends into the cavity.

6. The eyewear of claim 1 wherein a base member of the rear portion comprises a outwardly concave configuration along the length thereof, with an overmolded cover extending over at least a portion of the base member, the outwardly concave configuration corresponding to the configuration of the end slot, such that the rear portion can be snapped into a straight orientation that is substantially colinear with the front portion, to a curved orientation that is inwardly curved so as to follow a contour of a head of a user.

7. The eyewear of claim 6 wherein the base member comprises a spring steel and the overmolded cover comprises a polymer.

8. The eyewear of claim 1 wherein the first temple and the second temple are substantial mirror images of each other.

9. The eyewear of claim 1 wherein the first temple and the second temple are hingedly coupled to the frame front on opposite sides thereof.

* * * * *